(12) United States Patent
Tanaka et al.

(10) Patent No.: US 7,355,686 B2
(45) Date of Patent: Apr. 8, 2008

(54) OPTICAL SYSTEM INCLUDING MOLDED OPTICAL ELEMENT AND METHOD OF MANUFACTURING THE OPTICAL SYSTEM

(75) Inventors: Takashi Tanaka, Kawagoe (JP); Hiroaki Fujita, Kawaguchi (JP)

(73) Assignee: Fujinon Corporation, Saitama (JP)

( * ) Notice: Subject to any disclaimer, the term of this patent is extended or adjusted under 35 U.S.C. 154(b) by 520 days.

(21) Appl. No.: 11/058,367

(22) Filed: Feb. 16, 2005

(65) Prior Publication Data

US 2005/0210922 A1    Sep. 29, 2005

(30) Foreign Application Priority Data

Mar. 29, 2004   (JP)  .............................. 2004-095269

(51) Int. Cl.
*F21S 6/00*     (2006.01)
*A47B 23/06*    (2006.01)

(52) U.S. Cl. ...................................... 356/124; 356/128

(58) Field of Classification Search ................ 356/345, 356/360, 124, 239, 601–613; 359/654, 794; 350/432

See application file for complete search history.

(56) References Cited

U.S. PATENT DOCUMENTS

| | | | |
|---|---|---|---|
| 4,403,825 A * | 9/1983 | Tangonan et al. ............. 385/14 |
| 5,050,981 A * | 9/1991 | Roffman ...................... 351/177 |
| 5,143,659 A * | 9/1992 | Hamblen et al. ............. 264/1.1 |
| 5,828,453 A | 10/1998 | Yamamoto et al. |
| 6,368,524 B1 * | 4/2002 | Fujita et al. .................. 264/2.4 |
| 6,624,948 B1 * | 9/2003 | Miller et al. ................ 359/619 |
| 2006/0066945 A1 * | 3/2006 | Yeo et al. .................... 359/457 |

FOREIGN PATENT DOCUMENTS

JP     2000-249917     9/2000

* cited by examiner

*Primary Examiner*—Layla G. Lauchman
*Assistant Examiner*—Jarreas Underwood
(74) *Attorney, Agent, or Firm*—Arnold International; Jon W. Henry; Bruce Y. Arnold

(57) ABSTRACT

An optical system that includes a molded optical element having a non-uniform refractive index distribution due to molding and a method of manufacturing the optical system is disclosed. Data of the non-uniformity of the refractive index distribution associated with molding of the molded optical element is acquired and used in order to determine the form of an aspheric surface of the molded optical element for correcting aberrations caused by the non-uniformity of the refractive index distribution. This data may be acquired by measuring the refractive index distribution of an optical element molded based on initial design values that are based on assuming uniformity in the refractive index distribution of the molded optical element or it may be computed based on the form of the molded optical element. The optical element may include a concave optical surface and may be a lens element that includes an aspheric surface.

20 Claims, 7 Drawing Sheets

Spherical Aberration

Astigmatism

Distortion

Spherical Aberration

Astigmatism

Distortion

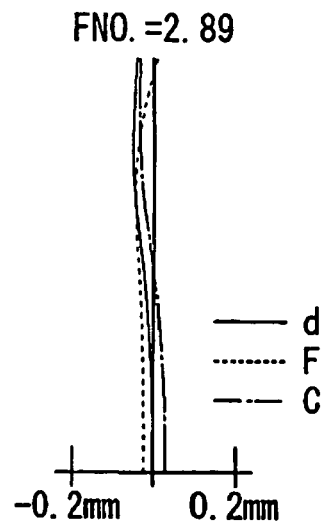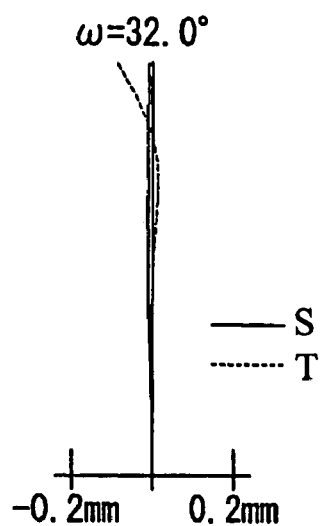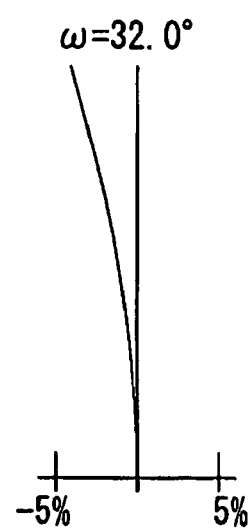
Spherical Aberration
Fig. 7A
Astigmatism
Fig. 7B
Distortion
Fig. 7C
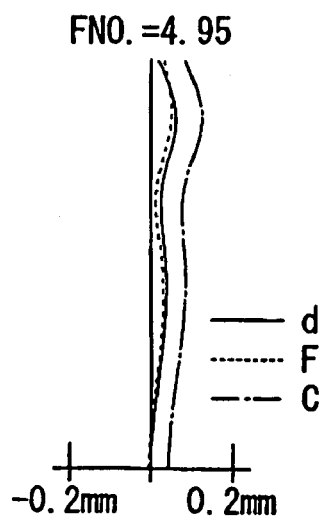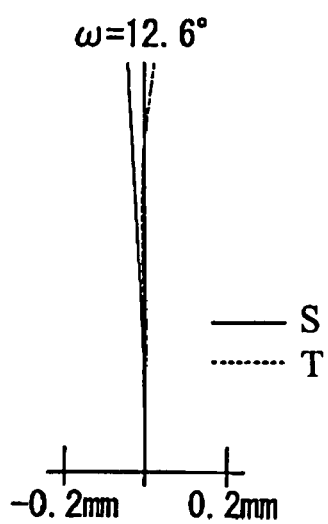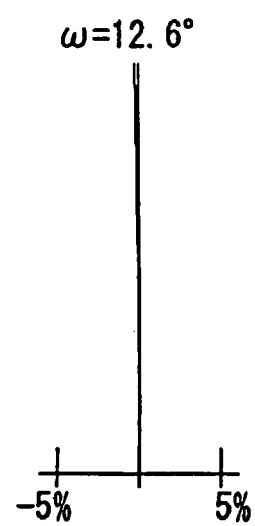
Spherical Aberration
Fig. 8A
Astigmatism
Fig. 8B
Distortion
Fig. 8C Spherical Aberration Astigmatism Distortion Spherical Aberration Astigmatism Distortion

OPTICAL SYSTEM INCLUDING MOLDED OPTICAL ELEMENT AND METHOD OF MANUFACTURING THE OPTICAL SYSTEM

FIELD OF THE INVENTION

The present invention relates to an optical system including a molded optical element having a non-uniform refractive index distribution due to molding, and to a method of manufacturing the optical system.

BACKGROUND OF THE INVENTION

Although it is common to manufacture optical elements made of plastic using a molding process, recently molding processes particularly known as glass molding methods have been used for molding lenses made of glass. For example, in imaging optical systems used for digital still cameras and video cameras, because aspheric lenses have recently come to be widely used, such molding processes designed for mass production have been widely used for producing aspheric lenses.

Molding processes for forming glass lenses include a heating process to soften the glass used as the raw material, a pressing process to press mold the softened glass raw material within a mold, a cooling process to cool the molded glass after this press molding, and a removal process to remove the cooled molded product from the mold. As a result, the refractive index distribution inside the molded product, which should ideally be uniform, may become non-uniform. If an optical system is manufactured using this molded optical element of which the refractive index distribution has become non-uniform, aberrations occur due to the non-uniformity of the refractive index distribution, degrading the optical performance.

Japanese Laid-Open Patent Application 2000-249917 describes a method of correction which uses aspheric surfaces in order to correct aberrations caused by the non-uniformity of the refractive index distribution (non-uniformity of the refractive index distribution in the radial direction centered on the optical axis) inside a lens of a projection optical system or an illumination optical system used in an exposure device. However, Japanese Laid-Open Patent Application 2000-249917 states that polishing is used as part of the lens processing, and there is no description regarding the non-uniformity of the refractive index distribution due to molding.

Recently, image pickup elements such as CCDs (Charge Coupled Device) used in digital still cameras, including image pickup elements that include more than five million pixels have been developed, and the number of pixels will continue to increase. Therefore, higher and higher resolutions are demanded of imaging lenses used in digital still cameras and similar imaging devices. Consequently, non-uniformity of the refractive index distribution inside the lens due to molding is a problem that can no longer be ignored in determining optical performance.

There is no description in Japanese Laid-Open Patent Application 2000-249917 of the non-uniformity of the refractive index distribution due to molding, and it is believed that the non-uniformity of the refractive index distribution that is described therein does not consider the non-uniformity generated by the processing, but relates to the non-uniformity of the refractive index distribution of the lens material itself that is placed in the mold. Also, while an aspheric surface is used for correcting aberrations caused by the non-uniformity of the refractive index distribution, processing of the aspheric surface is performed by the further processing of a molded lens element. It is believed that this is performed, for example, by further polishing of the lens element. Because it is difficult to remold a molded lens element after molding, the method described in Japanese Laid-Open Patent Application 2000-249917 cannot be immediately adopted to an optical system having a molded optical element. Although it is believed that individually reprocessing each lens element which has been manufactured is effective for optical systems of exposure devices that are to be produced in small quantity and for which expensive production is acceptable, it is not suitable for optical systems for products that are to be mass produced, such as digital still cameras, because it is too labor intensive and too costly.

On the other hand, much more non-uniformity of the refractive index distribution due to molding is likely to occur for certain forms of molded lens elements, for example, especially in cases where the lens element has a concave optical surface where the difference in thickness between the center and the periphery is large. This is believed to be a result of the cooling process after press molding, wherein the speed of cooling and contraction is different in different parts of the lens element, and this difference generates internal distortions. Therefore, there are many cases where the non-uniformity of the refractive index distribution is similarly distributed for molded optical elements of the same form. Additionally, in manufacturing an optical system having a molded optical element, properties attributable to molding need to be considered. Note that methods of manufacturing optical elements that use a long time in the cooling process or in relieving non-uniformity of the refractive index distribution by an annealing process after molding are not preferred because they tend to increase production costs.

BRIEF SUMMARY OF THE INVENTION

The present invention relates to an optical system including a molded optical element that can provide high optical performance, even when the refractive index distribution within the optical element is non-uniform due to molding, by correcting aberrations without performing an annealing process. The present invention further relates to a method of manufacturing such an optical system that includes such a molded optical element.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 7A-7C show the spherical aberration, astigmatism, and distortion, respectively, of the zoom lens of FIG. 3 at the wide-angle end considering non-uniformity of the refractive index distribution before correction;

FIGS. 8A-8C show the spherical aberration, astigmatism, and distortion, respectively, of the zoom lens of FIG. 3 at the telephoto end considering non-uniformity of the refractive index distribution before correction;

DETAILED DESCRIPTION

An embodiment of the present invention will now be explained in detail with reference to the drawings.

Figure 1:
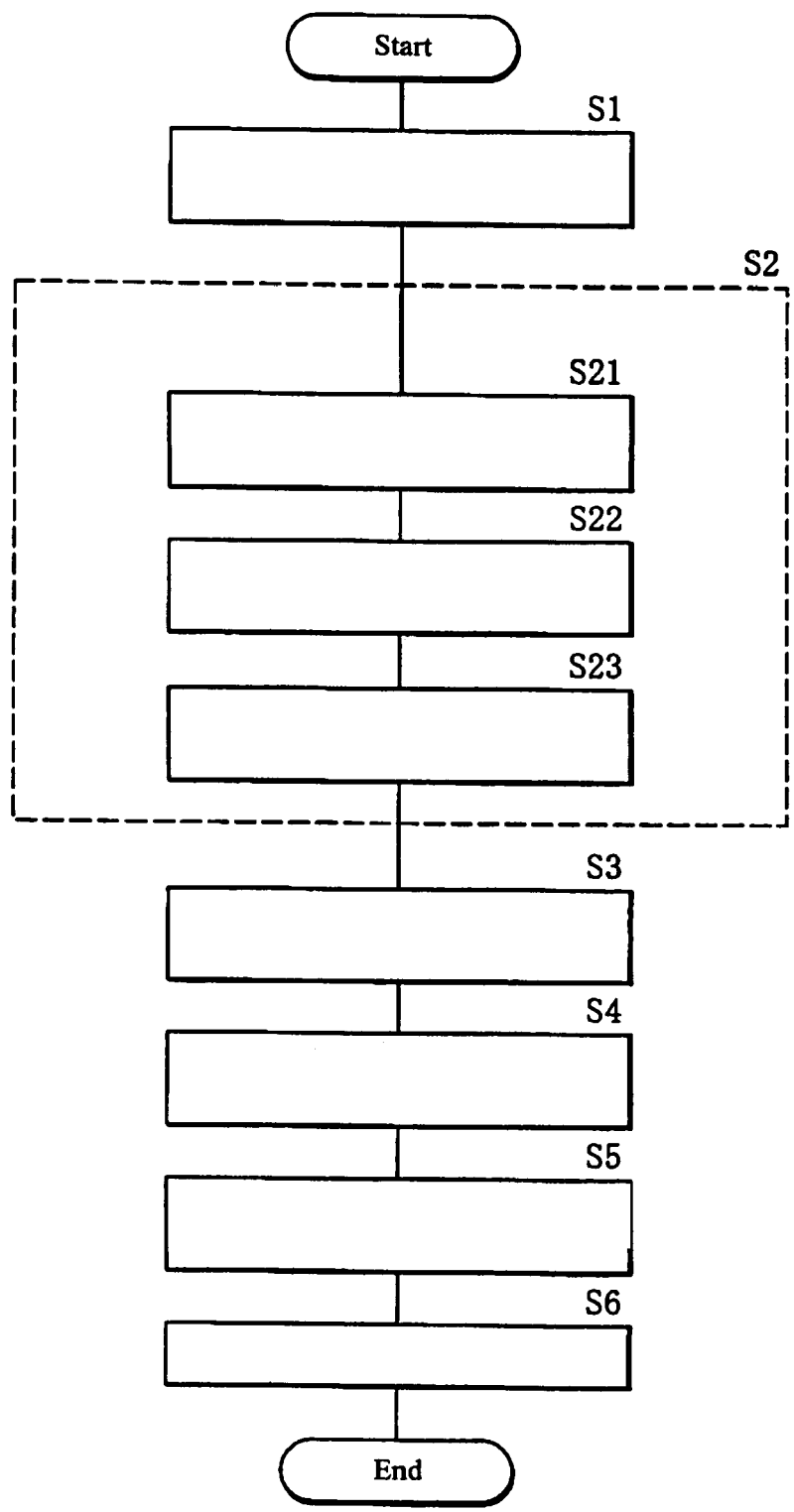
FIG. 1 shows a flow chart of a method of manufacturing an optical system including a molded optical element according to the present invention.

FIG. 1 shows a flow chart of a method of manufacturing an optical system including a molded optical element according to the present invention. This manufacturing method may be applied to an optical system having one or more molded optical elements, that is, manufactured by molding, and of which the refractive index distribution inside the optical element(s) is non-uniform (for example, the refractive index varies in the radial direction from its center on the optical axis) due to molding. Specifically, the present invention applies to imaging optical systems (for example, imaging optical systems for digital still cameras, video cameras, and similar devices) having an aspheric lens element as the molded optical element. However, the molded optical element may also be an optical element other than a lens element, such as for example a prism, or may be particularly an aspheric lens element. As used herein, in an optical system including a molded optical element according to the present invention and the related method of manufacturing an optical system including a molded optical element according to the present invention, the term "molded optical element" refers to optical elements in general that are manufactured by molding and that have a refractive index distribution defined by a varying refractive index at different points internally in the optical element, and to optical systems that use such optical elements, including imaging optical systems.

With reference to FIG. 1, the initial design of an optical system is performed, for example, using a computer with optical design software (Step S1). This initial optical design is performed assuming there is no non-uniformity of the refractive index distribution in a molded optical element due to molding, that is, assuming the refractive index is uniform within the molded optical element. In doing this, aberrations of the whole optical system with initial design values are computed, thereby defining a computer simulation of an optical analysis. The aberrations of the whole optical system with these initial design values may be called ideal aberrations based on their values and depending on the assumption of no non-uniformity of the refractive index distribution within the molded optical element due to molding.

Next, data of the non-uniformity of the refractive index distribution of the molded optical element due to molding is acquired (Step S2). This data is acquired, for example, by actually manufacturing a molded optical element for measurement based on the initial design values (Steps S21 and S22), and actually measuring the refractive index distribution of that manufactured molded optical element (Step S23). That is, data of the non-uniformity of the refractive index distribution associated with molding of the molded optical element may be acquired by measuring the refractive index distribution of an optical element molded based on initial design values that are based on assuming uniformity in the refractive index distribution of the molded optical element, and this data may then be used to compute a corrected form of a molded optical surface, such as an aspheric surface, by correcting the initial design values. The present invention is different, for example, from techniques that directly measure aberrations in order to redesign the form of an optical element based on data of the measured aberrations without acquiring data of the non-uniformity of the refractive index distribution. For example, as described above, in the present invention, a first molded optical element that is based on initial design values and assuming uniformity in the refractive index distribution may be measured in order to determine its refractive index distribution. In this case, the measurements may be used to compute a corrected form of a molded optical surface of a second molded optical element, and a mold having a duplicating surface corresponding to the corrected form may be prepared, and the second molded optical element molded in this mold.

Figure 2A:
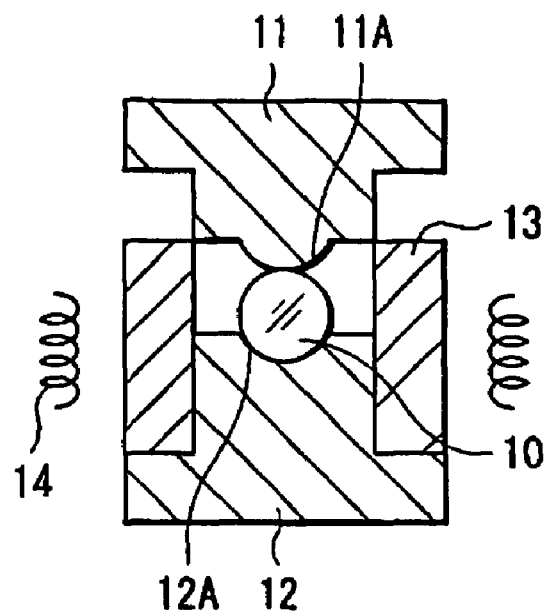
FIGS. 2A-2B show cross-sectional views of successive steps in a molding process of the optical element according to the present invention.
Figure 2B:
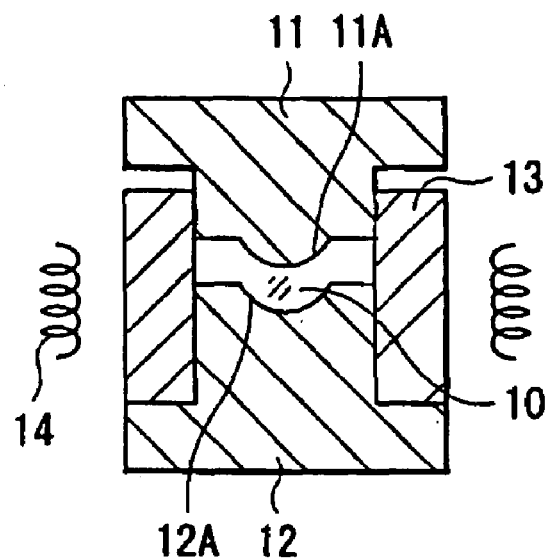

FIGS. 2A and 2B show cross-sectional views of successive steps in a molding process of the optical element according to the present invention. The device used for molding is equipped with an upper mold 11, a lower mold 12, and a body mold 13 as a mold (metal mold), and a heater 14. The upper mold 11 and the lower mold 12 have duplicate surfaces 11A and 12A, respectively, corresponding to the desired form of the molded optical element. In such a device, as shown in FIG. 2A, an optical element material 10 (for example, glass) that will become a molded optical element is loaded in the space surrounded by the upper mold 11, the lower mold 12, and the body mold 13. Then, the optical element material 10 is heated and softened by the heater 14, and the softened optical element material 10 is press molded with the upper mold 11 and the lower mold 12 as shown in FIG. 2B. Next, while the optical element material 10 is being pressed by the upper mold 11 and the lower mold 12, the device and the optical element material 10 are cooled. After cooling, the molded optical element material 10 is removed from the device.

In such a molding process, the refractive index distribution inside a molded product which ideally would become or remain uniform may become non-uniform due to molding. As mentioned previously, shapes that can easily develop non-uniformity of the refractive index distribution particularly are shapes that have a concave optical surface as a molded face and/or shapes with a large difference in thickness between the center and the periphery (such as a lens element with a concave lens surface), and this is believed to be because, in the cooling process after press molding, the speed of cooling and contraction differs depending on the location in the lens element, and this difference generates internal distortions. Therefore, there are many cases where the non-uniformity of the refractive index distribution is similar for molded optical elements of the same form. Data of this non-uniformity of the refractive index distribution within the molded optical element due to molding may be computed.

As stated above, because there are many cases where the non-uniform refractive index distribution due to molding is similar for molded optical elements of the same form, an accurate estimate of this distribution may be computed, for example, by a computer, based on parameters of the molding process, including the form of the molded optical element, without actually molding the optical element, in order to obtain input values for calculating the distribution. For example, input data of a non-uniform refractive index distribution may be acquired by computing estimates based on the form and characteristics of the material, such as the particular glass, being molded. In addition, the outer diameter and the thickness difference between the center and the periphery of the molded optical material are particularly useful in computing such estimates.

Next, by inputting the acquired data, such as the computed data of the non-uniformity of the refractive index distribution, aberrations of the whole optical system with the molded optical element having a non-uniform refractive index distribution are computed by computer simulation (Step S3). In this way, aberrations caused by a particular non-uniformity of the refractive index distribution are computed. Next, a new form of the molded face of the molded optical element that corrects aberrations caused by the non-uniformity of the refractive index distribution is computed (Step S4). Specifically, for example, correction of the initial design values is performed by redesigning the optical system using a computer with built-in optical design software so that aberrations of the whole optical system that are based on the computed data of the non-uniformity of the refractive index distribution become closer to the ideal aberrations based on the initial design values computed in Step S1. For example, if the molded optical element is an aspheric lens element, a corrected form of an aspheric surface is determined. Note that if the refractive index distribution is non-uniform, in the case of a lens element, for example, the non-uniformity is mainly in the radial direction centered on the optical axis, and thus the refractive index can be regarded as uniform in the circumferential direction about the optical axis and in directions parallel to the optical axis. In such a case, it is sufficient to base the calculations solely on non-uniformity of the refractive index distribution in the radial direction in order to achieve excellent correction of aberrations.

Next, a mold is made having mold duplicating surfaces corresponding to the computed corrected form (Step S5). This is based on data of the non-uniformity of the refractive index distribution associated with molding of the molded optical element having been acquired and having been used in order to determine the form of an aspheric surface of the molded optical element for correcting aberrations caused by the non-uniformity of the refractive index distribution. Then, molding of an actual molded optical element is performed using that mold (Step S6). By this means, a molded optical element is obtained of a form that can correct aberrations caused by non-uniformity of the refractive index distribution due to molding. The same mold can be used many times for mass production of equivalent molded optical elements and optical systems using the optical elements.

As described above, according to the manufacturing method of the present invention, based on data of the non-uniformity of the refractive index distribution due to molding, a corrected form of the molded face of a molded optical element that can correct aberrations caused by the non-uniformity is computed, a mold having mold duplicating surfaces corresponding to the corrected form is formed, and, in this mold, the molded optical element itself is molded in a form that can correct aberrations caused by non-uniformity of the refractive index distribution within the molded optical element. Therefore, in an optical system that includes this molded optical element, in comparison to when manufactured optical elements must be individually further processed, in the present invention, aberrations caused by non-uniformity of the refractive index distribution are corrected without being labor intensive or performing an annealing process that requires time, thereby keeping costs low while allowing excellent optical performance to be achieved.

Figure 3:
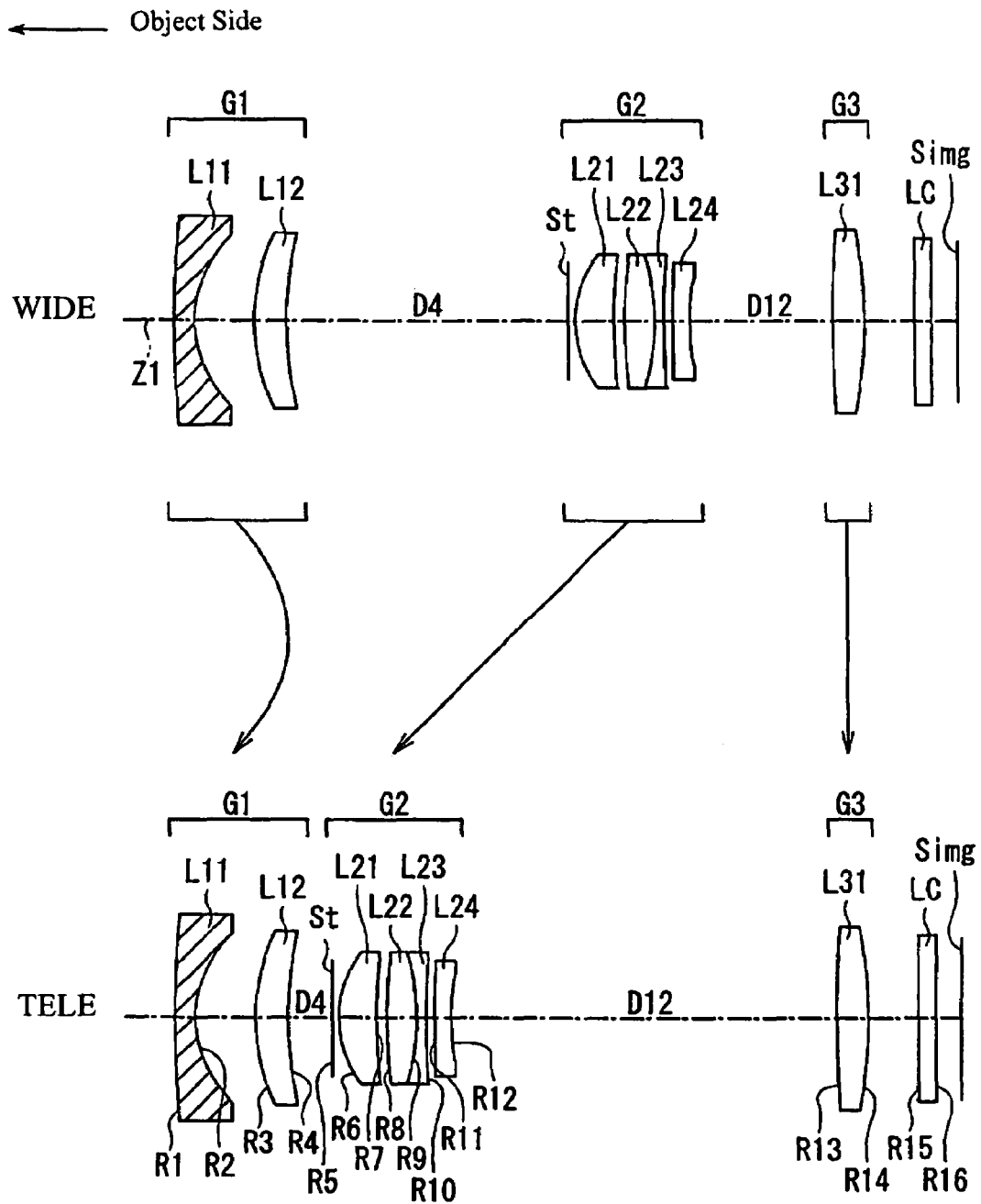
FIG. 3 shows cross-sectional views of a zoom lens at the wide-angle end (WIDE) and at the telephoto end (TELE) that includes a molded optical element according to the present invention.

FIG. 3 shows cross-sectional views of a zoom lens at the wide-angle end (WIDE) and at the telephoto end (TELE) that includes a molded optical element according to the present invention. The top portion of FIG. 3 shows the zoom lens at the wide-angle end of the zoom range and the bottom portion of FIG. 3 shows the zoom lens at the telephoto end of the zoom range. As shown in FIG. 3, the zoom lens is a three-group zoom lens that includes, arranged along the optical axis Z1 in order from the object side, a first lens group G1 of negative refractive power, a second lens group G2 of positive refractive power, and a third lens group G3 of positive refractive power. In the particular example of the present invention of FIG. 3, a stop St is positioned on the object side of the second lens group G2. In the top portion of FIG. 3, a horizontal arrow and the label "Object Side" points in one direction in order to indicate the object side of the zoom lens.

In the bottom portion of FIG. 3, the radii of curvature of the optical surfaces are referenced by the letter R followed by a number denoting their order from the object side of the zoom lens, from R1 to R16. The on-axis surface spacings along the optical axis Z1 of the optical surfaces that change during zooming of the zoom lens are referenced by the letter D followed by a number denoting their order from the object side of the zoom lens. Specifically, D4 and D12 are the on-axis surface spacings that change during zooming. This zoom lens is preferably built into an imaging optical system used, for example, for a digital still camera or a video camera.

As shown in FIG. 3, an image plane of the zoom lens on the right is denoted as Simg. At this image plane, an image pickup element (not shown), such as a CCD, is placed. Between the third lens group G3, which is the image-side lens group, and the image plane Simg, various types of optical members may be placed according to the construction of the camera body to which the zoom lens is attached. In the zoom lens shown in FIG. 3, a cover glass LC is placed adjacent the image plane Simg in order to protect it. Other optical members, such as an infrared cut-off filter and/or a low-pass filter may also be placed in this area.

In FIG. 3, a curved arrow that is concave toward the object side extends between the positions of the first lens group G1 in the upper and lower portions of FIG. 3 in order to indicate the locus of points of movement along the optical axis of the first lens group G1, as seen in the cross-sections that include the optical axis Z1, during zooming from the wide-angle end to the telephoto end. Similarly, a straight line arrow between the positions of the second lens group G2 in the upper and lower portions of FIG. 3 indicates the locus of points of movement of the second lens group G2 toward the object side during zooming from the wide-angle end to the telephoto end. Additionally, a vertical straight line arrow indicates that the third lens group G3 does not move along the optical axis Z1 during zooming. As indicated by these arrows in FIG. 3, during zooming from the wide-angle end to the telephoto end, the distance between the first lens group G1 and the second lens group G2 decreases, and the distance between the second lens group G2 and the third lens group G3 increases.

The first lens group G1 includes, arranged in order from the object side, a lens element L11 having negative refractive power and a lens element L12 having negative refractive power. The second lens group G2 includes, arranged in order from the object side, lens elements L21, L22, L23, and L24. The third lens group G3 includes only one positive lens element L31. In this zoom lens, at least lens element L11 is manufactured by molding, that is at least lens element L11 is a molded optical element.

In the present invention, the lens surfaces that are aspheric are defined using the following equation:

$$Z = (C \cdot Y^2)/[1 + \{1 - (1+K) \cdot C^2 \cdot Y^2\}^{1/2}] + \Sigma(A_i \cdot Y^i) \quad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R in mm) of the aspheric lens surface on the optical axis, Y is the distance (in mm) from the optical axis, K is the eccentricity, and $A_i$ is the ith aspheric coefficient, and the summation extends over i.

In the embodiment of the present invention that will be described below, aspheric coefficients other than $A_4$, $A_6$, $A_8$, and $A_{10}$ are zero.

Additionally, the refractive index of each molded optical element according to the present invention is considered to be uniform in the circumferential direction about the optical axis and in directions parallel to the optical axis, and is defined to vary in the radial direction centered on the optical axis according to the following equation that applies separately, with different values of N0, N2, N4, N6, and N8 being applicable for each of the d-line (587.6 nm), the C-line (656.3 nm), and the F-line (486.1 nm):

$$N = N0 + N2 \cdot Y^2 + N4 \cdot Y^4 + N6 \cdot Y^6 + N8 \cdot Y^8 \quad \text{Equation (B)}$$

where

Y is the distance (in mm) from the optical axis,

N is the refractive index at the distance Y,

N0 is the on-axis refractive index, and

N2, N4, N6, and N8 are refractive index variation coefficients.

An embodiment of an optical system, in particular the zoom lens as shown in FIG. 3, that includes a molded optical element according to the present invention and a method of manufacturing the optical system will be explained next with reference to Tables 1-5 below.

Tables 1-3 show initial design values of the zoom lens. Table 1 lists, in order from the object side, the lens group G1, the stop St, the lens groups G2 and G3, and the cover glass LC. Table 1 below also lists, in order from the object side, the surface number #, the radius of curvature R (in mm) of each surface on the optical axis, the on-axis surface spacing D (in mm), as well as the refractive index $N_d$, that is, the initial design value, and the Abbe number $\nu_d$ (both at the d-line of 587.6 nm) of each optical element for the zoom lens.

TABLE 1

| Group | # | R | D | $N_d$ | $V_d$ |
|---|---|---|---|---|---|
| G1 | 1* | 79.214 | 1.20 | 1.80610 | 40.7 |
| G1 | 2* | 6.467 | 3.59 | | |
| G1 | 3 | 12.634 | 1.91 | 1.92285 | 20.9 |
| G1 | 4 | 24.050 | D4 (variable) | | |
| St | 5 | ∞ | 0.40 | | |
| G2 | 6* | 6.617 | 2.28 | 1.69350 | 53.2 |
| G2 | 7* | 41.418 | 0.65 | | |
| G2 | 8 | 36.304 | 1.78 | 1.71300 | 53.9 |
| G2 | 9 | −14.000 | 0.55 | 1.84665 | 23.9 |
| G2 | 10 | 49.614 | 0.53 | | |
| G2 | 11* | 857.306 | 1.00 | 1.72249 | 29.2 |
| G2 | 12* | 25.755 | D12 (variable) | | |
| G3 | 13 | 91.393 | 1.92 | 1.48749 | 70.4 |
| G3 | 14 | −26.397 | 3.53 | | |
| LC | 15 | ∞ | 1.08 | 1.51680 | 64.2 |
| LC | 16 | ∞ | | | |

The surfaces with a * to the right of the surface number in Table 1 are aspheric lens surfaces, and the aspheric surface shapes are expressed by Equation (A) above. These aspheric surfaces include both surfaces of each of the lens elements L11, L21 and L24 shown in FIG. 3.

Table 2 below lists the values of the constant K and the aspherical coefficients $A_4$, $A_6$, $A_8$, and $A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E−2" represents the number $1.0 \times 10^{-2}$.

TABLE 2

| # | K | $A_4$ | $A_6$ | $A_8$ | $A_{10}$ |
|---|---|---|---|---|---|
| 1 | 0.00679 | 1.17107E−4 | −4.75153E−6 | 8.19901E−8 | −5.81788E−10 |
| 2 | −2.97160 | 1.22469E−3 | −2.34701E−5 | 3.87317E−7 | −3.25219E−9 |
| 6 | 0.28504 | −6.39013E−5 | −1.47297E−6 | −5.95988E−8 | −6.68611E−9 |
| 7 | 0.06223 | 2.62958E−4 | −3.42243E−6 | −3.38805E−7 | −2.88129E−10 |
| 11 | −7.84343 | 1.68951E−3 | −8.33833E−5 | −2.64899E−6 | −1.06940E−8 |
| 12 | 3.45181 | 2.76552E−3 | −3.84376E−5 | −1.51248E−6 | −4.20761E−9 |

In the zoom lens of FIG. 3, both the first lens group G1 and the second lens group G2 move during zooming. Therefore, the on-axis spacings D4 and D12 change with zooming. With zooming, the paraxial focal length f, the f-number $F_{NO}$, and the maximum field angle 2ω also change. Table 3 below lists the values of the focal length f (in mm), the f-number $F_{NO}$, the maximum field angle 2ω, and the variables D4 and D12 (in mm) at the wide-angle end and at the telephoto end when the zoom lens is focused at infinity.

TABLE 3

| Setting | f | $F_{NO}$ | $2_\omega$ | D4 | D12 |
|---|---|---|---|---|---|
| Wide-angle end | 8.00 | 2.89 | 63.9° | 17.03 | 8.56 |
| Telephoto end | 22.01 | 5.06 | 24.7° | 2.60 | 23.00 |

The initial design values of Tables 1-3 above do not take into account the refractive effects of non-uniformity of the refractive index distribution within the molded lens element L11 that affect aberrations of the zoom lens.

Table 4 below lists the values of the on-axis refractive index N0, and the refractive index variation coefficients N2, N4, N6, and N8 that are applicable to Equation (B) above for each of the following wavelengths: the C-line (656.3 nm), the d-line (587.6 nm), and the F-line (486.1 nm) used in describing the refractive index N as it varies radially from the center of the molded lens element L11 for each of the three wavelengths, with the refractive index N being considered to be uniform in the circumferential direction about the optical axis and in the optical axis direction. An "E" in the data indicates that the number following the "E" is the exponent to the base 10. For example, "1.0E-2" represents the number $1.0\times10^{-2}$.

TABLE 4

| Refractive Index/ Refractive Index Variation Coefficient | C-line | d-line | F-line |
|---|---|---|---|
| N0 | 1.80022 | 1.80610 | 1.82001 |
| N2 | −0.11203E−3 | −0.11203E−3 | −0.11203E−3 |
| N4 | 0.81128E−5 | 0.81128E−5 | 0.81128E−5 |
| N6 | −0.22200E−6 | −0.22200E−6 | −0.22200E−6 |
| N8 | 0.20737E−8 | 0.20737E−8 | 0.20737E−8 |

Figure 4:
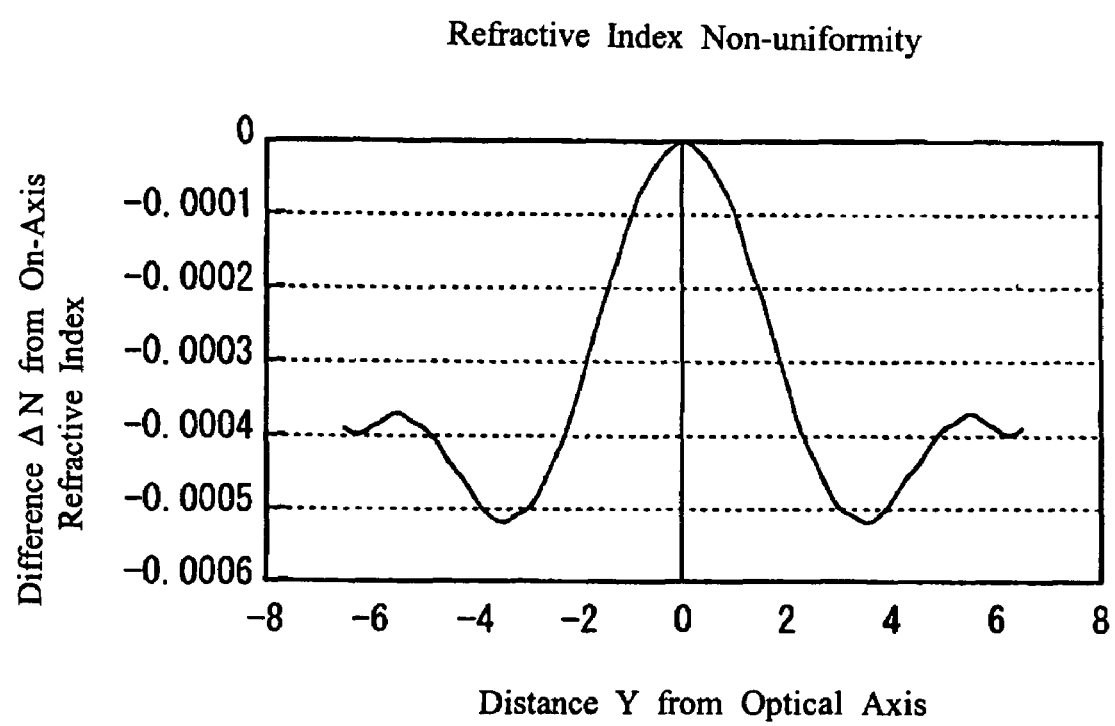
FIG. 4 shows the non-uniformity of the refractive index distribution radially of the molded optical element included in the zoom lens shown in FIG. 3.

FIG. 4 shows the non-uniform refractive index distribution radially of the molded optical element according to the present invention of the zoom lens of FIG. 3. In FIG. 4, the horizontal axis indicates the distance Y (in mm) from the optical axis Z1 and the vertical axis indicates the refractive index N according to Equation (B) but with the top of the vertical line indicated by zero on the left hand side of FIG. 4 corresponding to the value N0 in Equation (B) above. In the present embodiment of the invention, only the object-side surface of the first lens element L11 is corrected. That is, for all other surfaces of the optical elements, including all the lens elements, the initial design values of Tables 1 and 2 above remain the same.

Table 5 below lists the corrected values of the radius of curvature R (in mm) on the optical axis, the constant K, and the aspherical coefficients $A_4$, $A_6$, $A_8$, and $A_{10}$ used in Equation (A) above for the object-side surface the lens element L11. Aspheric coefficients that are not present in Table 5 are zero. An "E" in the data indicates that the number following the "E" is the exponent to the base 10. For example, "1.0E-2" represents the number $1.0\times10^{-2}$.

TABLE 5

| # | R | K | $A_4$ | $A_6$ | $A_8$ | $A_{10}$ |
|---|---|---|---|---|---|---|
| 1 | 81.230 | 0.00771 | 1.19495E−4 | −4.53784E−6 | 7.29403E−8 | −4.89318E−10 |

Figure 5A:
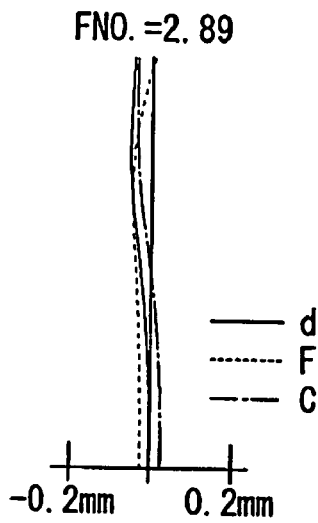
FIGS. 5A-5C show the spherical aberration, astigmatism, and distortion, respectively, of the zoom lens of FIG. 3 at the wide-angle end using initial design values.
Figure 5B:
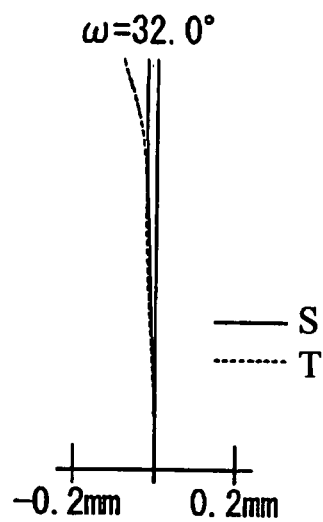
Figure 5C:
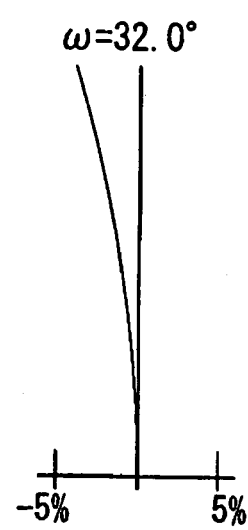
Figure 6A:
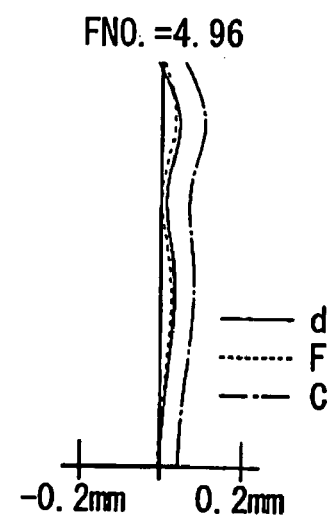
FIGS. 6A-6C show the spherical aberration, astigmatism, and distortion, respectively, of the zoom lens of FIG. 3 at the telephoto end using initial design values.
Figure 6B:
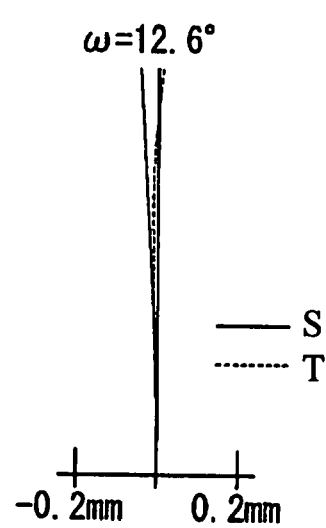
Figure 6C:
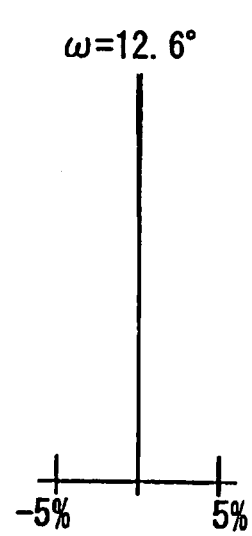

FIGS. 5A-5C show the spherical aberration, astigmatism, and distortion, respectively, of the zoom lens of FIG. 3 at the wide-angle end using initial design values. FIGS. 6A-6C show the spherical aberration, astigmatism, and distortion, respectively, of the zoom lens of FIG. 3 at the telephoto end using initial design values. In FIGS. 5A and 6A, the spherical aberration is shown for the following wavelengths: the d-line (587.6 nm), the F-line (486.1 nm), and the C-line (656.3 nm). In FIGS. 5B, 5C, 6B, and 6C, ω is the half-field angle. In FIGS. 5B and 6B, the astigmatism is shown for the sagittal image surface S and the tangential image surface T at the d-line (587.6 nm). In FIGS. 5C and 6C, distortion is measured at the d-line (587.6 nm).

In contrast, FIGS. 7A-7C show the spherical aberration, astigmatism, and distortion, respectively, of the zoom lens of FIG. 3 at the wide-angle end considering non-uniformity of the refractive index distribution before correction according to the present invention, and FIGS. 8A-8C show the spherical aberration, astigmatism, and distortion, respectively, of the zoom lens of FIG. 3 at the telephoto end considering non-uniformity of the refractive index distribution before correction according to the present invention. In FIGS. 7A and 8A, the spherical aberration is shown for the following wavelengths: the d-line (587.6 nm), the F-line (486.1 nm), and the C-line (656.3 nm). In FIGS. 7B, 7C, 8B, and 8C, ω is the half-field angle. In FIGS. 7B and 8B, the astigmatism is shown for the sagittal image surface S and the tangential image surface T at the d-line (587.6 nm). In FIGS. 7C and 8C, distortion is measured at the d-line (587.6 nm).

Figure 9A:
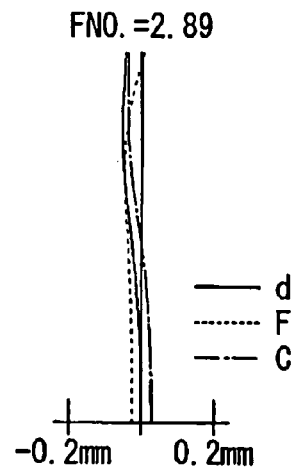
FIGS. 9A-9C show the spherical aberration, astigmatism, and distortion, respectively, of the zoom lens of FIG. 3 at the wide-angle end considering non-uniformity of the refractive index distribution after correction according to the present invention.
Figure 9B:
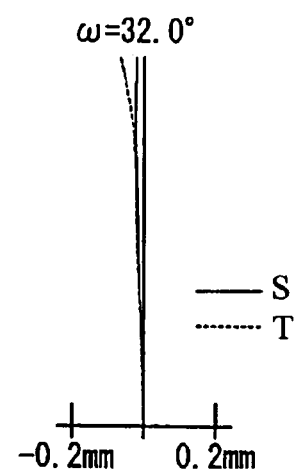
Figure 9C:
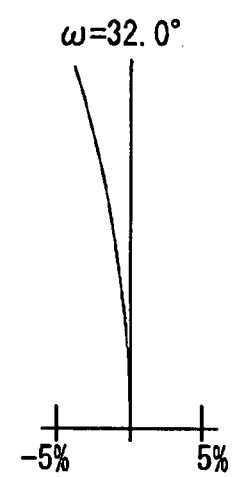
Figure 10A:
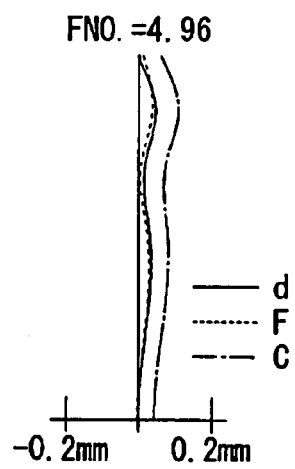
FIGS. 10A-10C show the spherical aberration, astigmatism, and distortion, respectively, of the zoom lens of FIG. 3 at the telephoto end considering non-uniformity of the refractive index distribution after correction according to the present invention.
Figure 10B:
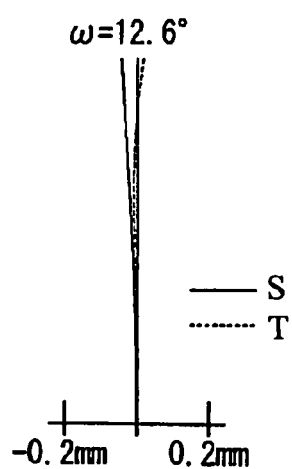
Figure 10C:
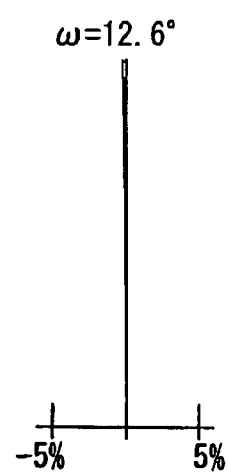

In further contrast, and in accordance with the present invention, FIGS. 9A-9C show the spherical aberration, astigmatism, and distortion, respectively, of the zoom lens of FIG. 3 at the wide-angle end considering non-uniformity of the refractive index distribution after correction according to the present invention, and FIGS. 10A-10C show the spherical aberration, astigmatism, and distortion, respectively, of the zoom lens of FIG. 3 at the telephoto end considering non-uniformity of the refractive index distribution after correction according to the present invention. In FIGS. 9A and 10A, the spherical aberration is shown for the following wavelengths: the d-line (587.6 nm), the F-line (486.1 nm), and the C-line (656.3 nm). In FIGS. 9B, 9C, 10B, and 10C, ω is the half-field angle. In FIGS. 9B and 10B, the astigmatism is shown for the sagittal image surface S and the tangential image surface T at the d-line (587.6 nm). In FIGS. 9C and 10C, distortion is measured at the d-line (587.6 nm).

As can be seen from the above descriptions, Tables, and Figures described above, in the zoom lens of the present invention, even when the refractive index distribution becomes non-uniform due to molding, aberrations caused by the non-uniformity of the refractive index distribution are corrected, and the desired optical performance is achieved.

The present invention is not limited to the aforementioned embodiment, as it will be immediately apparent that various alternative implementations are possible. For instance, values such as the radius of curvature R of each of the lens components, the shapes of the aspheric lens surfaces, the surface spacings D, the refractive index $N_d$, and Abbe number $v_d$ of the lens elements are not limited to those indicated, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A method of manufacturing an optical system including a molded optical element comprising the following steps:
   acquiring data of the non-uniformity of the refractive index distribution due to molding of the molded optical element;
   computing aberrations due to the non-uniformity of the refractive index distribution based on the acquired data of the non-uniformity of the refractive index distribution;
   computing a corrected form of a molded optical surface of the molded optical element that corrects said aberrations due to the non-uniformity of the refractive index distribution; and
   molding the molded optical element with a mold having duplicating surfaces corresponding to the corrected form.

2. The method of manufacturing an optical system including a molded optical element according to claim 1, wherein the step of acquiring data of the non-uniformity of the refractive index distribution includes the following steps:
   making a first mold based on initial design values that assumes uniformity in the refractive index distribution of a molded optical element;
   molding a first molded optical element in the first mold;
   measuring the refractive index distribution of said first molded optical element;
   computing data of the non-uniformity of the refractive index distribution of said first molded optical element; and
   in said step of computing a corrected form of a molded optical surface, the corrected form is computed by correcting initial design values based on the computed data of the non-uniformity of the refractive index distribution of said first molded optical element.

3. The method of manufacturing an optical system including a molded optical element according to claim 1, said optical system including a plurality of molded optical elements, said plurality of molded optical elements including at least one molded optical element having a form that is not likely to acquire non-uniformity of the refractive index distribution and at least one molded optical element having a form that is likely to acquire non-uniformity of the refractive index distribution, wherein said steps are performed only on an optical element having a form that is likely to acquire non-uniformity of the refractive index distribution.

4. The method of manufacturing an optical system including a molded optical element according to claim 2, said optical system including a plurality of molded optical elements, said plurality of molded optical elements including at least one molded optical element having a form that is not likely to acquire non-uniformity of the refractive index distribution and at least one molded optical element having a form that is likely to acquire non-uniformity of the refractive index distribution, wherein said steps are performed only on an optical element having a form that is likely to acquire non-uniformity of the refractive index distribution.

5. The method of manufacturing an optical system including a molded optical element according to claim 1, wherein the molded optical element is a lens having a concave optical surface.

6. The method of manufacturing an optical system including a molded optical element according to claim 2, wherein said first molded optical element is a lens having a concave optical surface.

7. The method of manufacturing an optical system including a molded optical element according to claim 3, wherein the molded optical element is a lens having a concave optical surface.

8. The method of manufacturing an optical system including a molded optical element according to claim 4, wherein the molded optical element is a lens having a concave optical surface.

9. The method of manufacturing an optical system including a molded optical element according to claim 1, wherein:
   the molded optical element is a lens element having at least one aspheric surface; and
   in the step of computing a corrected form of a molded optical surface, the corrected form includes the shape of said aspheric surface.

10. The method of manufacturing an optical system including a molded optical element according to claim 2, wherein:
    said first molded optical element is a lens element having at least one aspheric surface; and
    in the step of computing a corrected form of a molded optical surface, the corrected form includes the shape of said aspheric surface.

11. The method of manufacturing an optical system including a molded optical element according to claim 3, wherein:
    said molded optical element is a lens element having at least one aspheric surface; and
    in the step of computing a corrected form of a molded optical surface, the corrected form includes the shape of said aspheric surface.

12. The method of manufacturing an optical system including a molded optical element according to claim 4, wherein:
    said molded optical element is a lens element having at least one aspheric surface; and
    in the step of computing a corrected form of a molded optical surface, the corrected form includes the shape of said aspheric surface.

13. An optical system including a molded optical element having a non-uniform refractive index distribution due to molding, wherein said molded optical element is produced according to the method of claim 1.

14. An optical system including a molded optical element having a non-uniform refractive index distribution due to molding, wherein said molded optical element is produced according to the method of claim 2.

15. An optical system including a molded optical element having a non-uniform refractive index distribution due to molding, wherein said molded optical element is produced according to the method of claim 3.

16. An optical system including a molded optical element having a non-uniform refractive index distribution due to molding, wherein said molded optical element is produced according to the method of claim 4.

17. The optical system including a molded optical element according to claim 13, wherein the molded optical element includes a concave optical surface.

18. The optical system including a molded optical element according to claim 14, wherein the molded optical element includes a concave optical surface.

19. The optical system including a molded optical element according to claim 15, wherein the molded optical element includes a concave optical surface.

20. The optical system including a molded optical element according to claim 16, wherein the molded optical element includes a concave optical surface.

* * * * *